(12) United States Patent
Aryanto et al.

(10) Patent No.: US 8,214,753 B2
(45) Date of Patent: Jul. 3, 2012

(54) LOGIC FOR DESIGNING PORTLET VIEWS

(75) Inventors: Jeffrey Aryanto, The Colony, TX (US); Yixing Gong, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 12/390,069

(22) Filed: Feb. 20, 2009

(65) Prior Publication Data

US 2010/0218124 A1 Aug. 26, 2010

(51) Int. Cl.
 *G06F 3/00* (2006.01)
(52) U.S. Cl. .................................... 715/762
(58) Field of Classification Search ............ 715/762
 See application file for complete search history.

(56) References Cited

U.S. PATENT DOCUMENTS

| | | |
|---|---|---|
| 2003/0140115 A1 | 7/2003 | Mehra |
| 2004/0049596 A1* | 3/2004 | Schuehler et al. ............ 709/238 |
| 2004/0172618 A1 | 9/2004 | Marvin |
| 2005/0065860 A1 | 3/2005 | Alger et al. |
| 2005/0065913 A1 | 3/2005 | Lillie et al. |
| 2005/0182824 A1 | 8/2005 | Cotte |
| 2005/0198201 A1* | 9/2005 | Bohn et al. .................... 709/218 |
| 2005/0267789 A1 | 12/2005 | Satyadas et al. |
| 2007/0006083 A1 | 1/2007 | Daniels et al. |
| 2008/0077595 A1* | 3/2008 | Leebow ........................ 707/10 |
| 2008/0127133 A1 | 5/2008 | Aghara et al. |
| 2008/0307341 A1* | 12/2008 | Ferry et al. .................... 715/764 |

FOREIGN PATENT DOCUMENTS

WO WO 2007014788 A1 * 2/2007

* cited by examiner

*Primary Examiner* — Namitha Pillai
*Assistant Examiner* — Angie Badawi
(74) *Attorney, Agent, or Firm* — John R. Pivnichny; Law Office of Jim Boice

(57) ABSTRACT

A computer-implemented method, system and computer program product of designing views of portlets are presented. The computer-implemented method, which is executed on a specific processor, receives, from a client, multiple requirements for portlets and views of a portal application. Common business components are then extracted from the multiple requirements, and the business components are classified into categories of containers, data entry forms, or tables. A library of implemented common business components is created and provided to multiple developers, who are then able to design the views of the portlets, such that the portal application views will have a similar look and feel.

14 Claims, 8 Drawing Sheets

200
▷ TWISTY NAME
▷ TWISTY NAME
▷ TWISTY NAME

FIG. 2

300
| TAB NAME | TAB NAME | TAB NAME | TAB NAME |

FIG. 3

400
LABEL: TEXT ▽    LABEL: TEXT       LABEL: TEXT
LABEL: TEXT      LABEL: TEXT       LABEL: TEXT
LABEL: TEXT      LABEL: TEXT       LABEL: TEXT
LABEL: TEXT      LABEL: TEXT ▽     LABEL: TEXT
LABEL: TEXT      LABEL: TEXT       LABEL: TEXT
CLEAR FORM                         SUBMIT   CANCEL

FIG. 4

500
LABEL: TEXT              LABEL: TEXT              LABEL: TEXT
LABEL: TEXT              LABEL: TEXT  LABEL: TEXT LABEL: TEXT
LABEL: TEXT LABEL: TEXT  LABEL: TEXT              LABEL: TEXT
LABEL: TEXT              LABEL: TEXT              LABEL: TEXT  LABEL: TEXT
LABEL: TEXT              LABEL: TEXT              LABEL: TEXT

FIG. 5

| | HEADER | HEADER | HEADER | HEADER | HEADER | HEADER | HEADER |
|---|---|---|---|---|---|---|---|
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |

RESULTS: 1 - 10 OF 36     600     RESULT PAGE: 1 | 2 | 3 | 4

FIG. 6

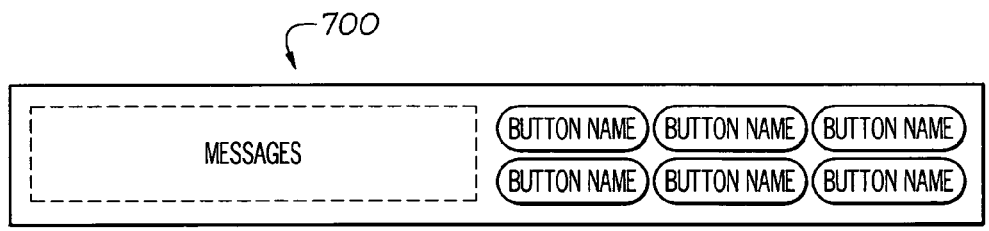

FIG. 7

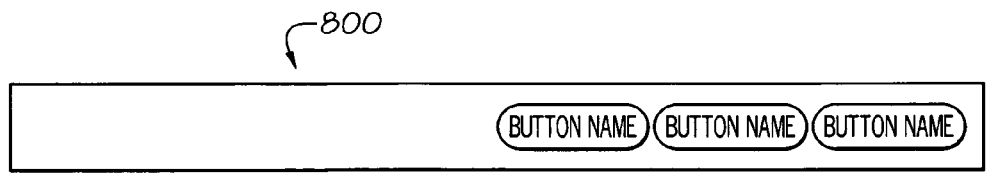

FIG. 8

RESULTS: 1 - 10 OF 36                                              RESULT PAGE: 1 | 2 | 3 | 4

1400

| | HEADER | | | | | | |
|---|---|---|---|---|---|---|---|
| | HEADER | HEADER | HEADER | HEADER | HEADER | HEADER | HEADER |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |
| 🔍 | TEXT | TEXT | TEXT | TEXT | TEXT | TEXT | TEXT |

FIG. 14

LOGIC FOR DESIGNING PORTLET VIEWS

BACKGROUND OF THE INVENTION

1. Technical Field

The present disclosure relates to the field of computers, and specifically to the logic for managing portals and portlet views.

2. Description of the Related Art

A web portal (portal) is software that presents information from diverse sources to a user in a consistent manner. That is, portals provide a way for a content provider to present information from diverse sources to a user such that the information has a consistent appearance on a page. Often, a portal is devoted to a particular subject, such as e-mail, weather, finance, sports, enterprise-centric information, etc.

Portlets are user interface software components that can be plugged into a portal, and are managed and displayed in the portal. As such, portlets produce fragments of markup code that are aggregated into a portal page.

Thus, a portal application may consist of many portlets, and each portlet may have many different views of very complicated user interface design, such as customer call center service applications for insurance agents. Because of the complexity of the views of the portlets, it is very difficult and time-consuming to develop those portlets. Since a group of portal developers often develop those portlets separately in a portal project, it is very difficult to create a consistent look and feel among those portlets. It is also very difficult for others to understand and maintain the codes of those portlets.

Portal developers often apply application development tools to create portlets. These tools provide wizards to let developers drag and drop the user interface elements into portlets. However, these wizards are at the user interface element level, such as an input field and a button, and are not at the application level.

SUMMARY OF THE INVENTION

To address the above described issue, a computer-implemented method, system and computer program product of designing views of portlets are presented. The computer-implemented method, which is executed on a specific processor, receives, from a client, multiple requirements for portlets and views of a portal application. Common business components are then extracted from the multiple requirements, wherein the business components are classified into categories of containers, data entry forms, and/or tables. A library of implemented common business components is created and provided to multiple developers, who are then able to design the views of the portlets, such that the portal application views will have a similar look and feel.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2 illustrates a twisty that may be used as a user interface component of views of a portlet;

FIG. 3 depicts a tab that may be used as a user interface component of views of a portlet;

FIG. 4 illustrates a data input form that may be used as a user interface component of views of a portlet;

FIG. 5 depicts a data display that may be used as a user interface component of views of a portlet;

FIG. 6 illustrates a data display table that may be used as a user interface component of views of a portlet;

FIG. 7 depicts top buttons that may be used as a user interface component of views of a portlet;

FIG. 8 illustrates bottom buttons that may be used as a user interface component of views of a portlet;

FIG. 14 illustrates a double header data display table that may be used as a user interface component of views of a portlet;

DETAILED DESCRIPTION OF THE PREFERRED EMBODIMENT

Figure 1:
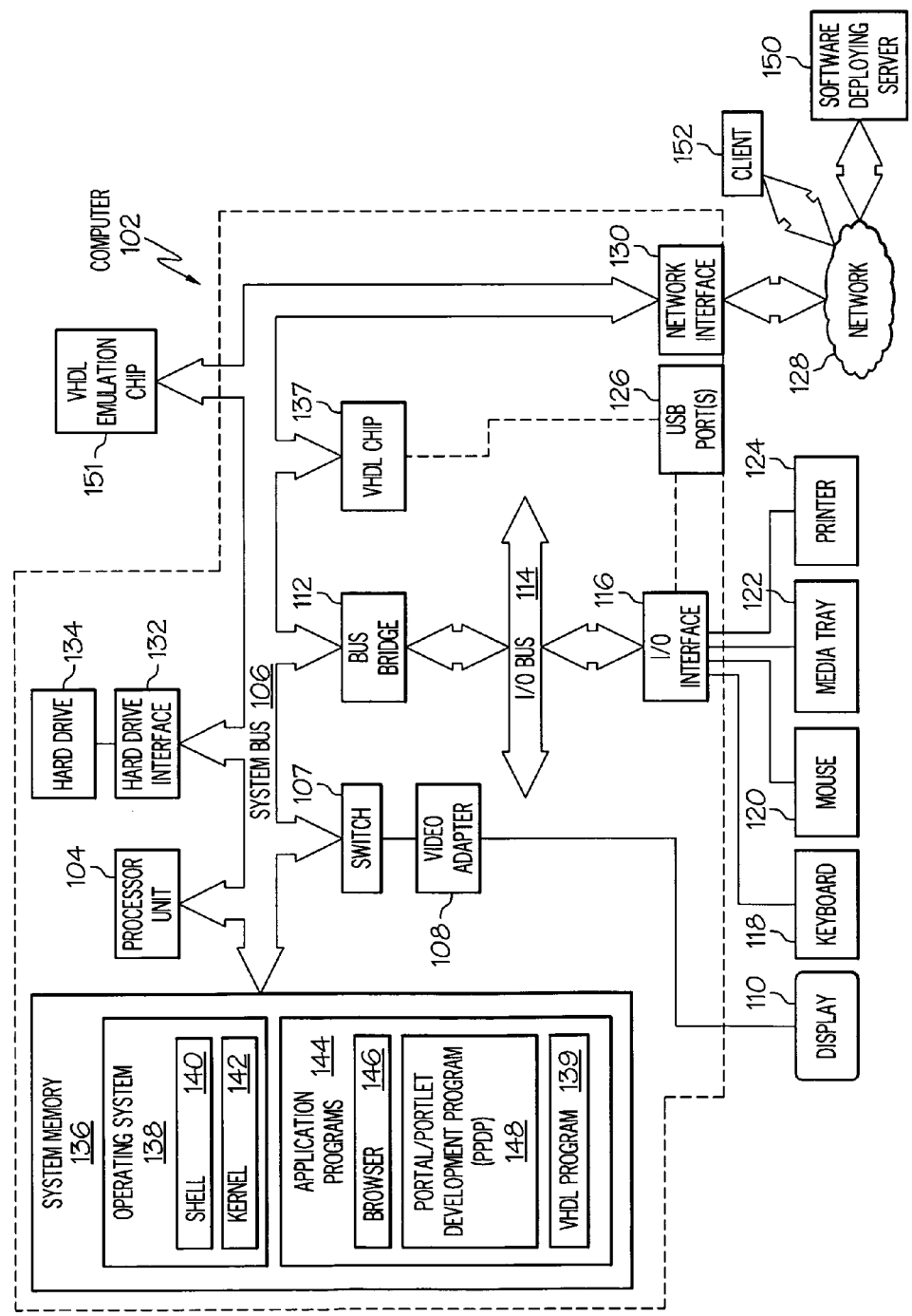
FIG. 1 depicts an exemplary computer in which the present invention may be implemented.

With reference now to the figures, and in particular to FIG. 1, there is depicted a block diagram of an exemplary computer 102, which may be utilized by the present invention. Note that some or all of the exemplary architecture shown for computer 102 may be utilized by client 152 and/or software deploying server 150.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional, only upon execution of instructions (e.g., Portal/Portlet Development Program—PPDP 148 described below) that perform the method described herein. This switching causes a substantive transformation of the computer 102 from a system in which pending steps and/or results of the herein described method are NOT displayed, into a system in which these results ARE displayed.

System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), USB port(s) 126. While the format of the ports connected to I/O interface 116 may be any known to those skilled in the art of computer architecture, in a preferred embodiment some or all of these ports are Universal Serial Bus (USB) ports.

As depicted, computer 102 is able to communicate with a software deploying server 150 via network 128 using a network interface 130. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a Portal/Portlet Development Program (PPDP) 148. PPDP 148 includes code for implementing the processes described below, including those described in FIGS. 2-16. In one embodiment, computer 102 is able to download PPDP 148 from software deploying server 150, including in an on-demand basis. Note further that, in one embodiment of the present invention, software deploying server 150 performs all of the functions associated with the present invention (including execution of PPDP 148), thus freeing computer 102 from having to use its own internal computing resources to execute PPDP 148.

Also stored in system memory 136 is a VHDL (VHSIC Hardware Description Language) program 139. VHDL is an exemplary design-entry language for Field Programmable Gate Arrays (FPGAs), Application Specific Integrated Circuits (ASICs), and other similar electronic devices. In one embodiment, execution of instructions from PPDP 148 causes VHDL program 139 to configure VHDL chip 137, which may be an FPGA, ASIC, etc. This programming of VHDL chip 137 causes a substantial transformation of the architecture of computer 102, wherein (assuming that USB port(s) 126 are NOT coupled to I/O interface 116) USB port(s) 126 are now selectively coupled to system bus 106 via VHDL chip 137.

In another embodiment of the present invention, execution of instructions from PPDP 148 results in a utilization of VHDL program 139 to program a VHDL emulation chip 151. VHDL emulation chip 151 may incorporate a similar architecture as described above for VHDL chip 137. Once PPDP 148 and VHDL program 139 program VHDL emulation chip 151, VHDL emulation chip 151 performs, as hardware, some or all functions described by one or more executions of some or all of the instructions found in PPDP 148. That is, the VHDL emulation chip 151 is a hardware emulation of some or all of the software instructions found in PPDP 148. In one embodiment, VHDL emulation chip 151 is a Programmable Read Only Memory (PROM) that, once burned in accordance with instructions from PPDP 148 and VHDL program 139, is permanently transformed into a new circuitry that performs the functions of element 206 shown below in FIG. 2. Thus, VHDL emulation chip 151 is also properly viewed as a machine that is under the control of computer 102. Note that while VHDL emulation chip 151 is depicted as being a different entity that is separate from computer 102, in another embodiment VHDL emulation chip 151 may be an integral part of computer 102.

Note that the hardware depicted in FIG. 1 may be utilized as specific hardware logic for implementing the present invention. For example, network interface 130 and processor 104 may be hardware receiving logic for receiving from client 152 multiple requirements for portlets and views of an application. Similarly, processor 104 may function as an extracting logic for extracting common business components from the multiple requirements, wherein the business components are classified into categories of containers. Hard drive 134 and processor 104 may also function as a creating logic for creating a library of implemented common business components. Network interface 130 and processor 104 may also function as a providing logic for providing the library to multiple developers to design the views of the portlets, wherein the views will have a similar look and feel. Processor 104 and video adapter 108 may function as creating logic for creating standardized portlets and/or portal applications using the library of implemented common business components.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

In order to describe the present invention, it should be understood that a portal application, such as a customer call center service application for insurance agents, may consist of dozens of portlets. Each portlet may have very complicated views to let the agents input data and to let portlets present data to the agents. Although these views are very complicated, they are composed of some commonly used business user interface components in a customer call center service application. In accordance with the present invention, these commonly used business user interface components are identified by PPDP 148 and are extracted into standard business user interface components. These standard business user interface components are then used to design the views of portlets. A library of those implemented standard business user interface components is then created. This enables portal developers to create the views of those portlets by assembling those standard business user interface components from the library into views of portlets, and then making any necessary changes to those standard business user interface components to complete the development of views of portlets, which in turn make up the portal application.

For an exemplary embodiment of the present invention, consider now a customer call center service application for insurance agents, in which the use of a standard business user interface component based approach is used to develop the views of portlets for a portal application. A customer call center service application for insurance agents consists of dozens of portlets. Each portlet has several views as the user interfaces of that portlet. Each view contains many different user interface elements to allow a user to input data and to allow the portlet to display data. Although the views of these portlets look quite different, they are composed of some commonly used business user interface components. These commonly used business user interface components are called standard business user interface components. The commonly used business user interface components are extracted and classified into several categories. For example, a user/developer may identify the following seven standard business user interface components for a customer call center service application: a twisty 200 as shown in FIG. 2; a Tab 300 as shown in FIG. 3; a Data Input Form 400 as shown in FIG. 4; a Data Display Form 500 shown in FIG. 5; a Data Display Table 600 as shown in FIG. 6; Top Buttons 700 as shown in FIG. 7; Bottom Buttons 800 as shown in FIG. 8; and a Double Header Data Display Table 1400 as shown in FIG. 14.

These eight standard business user interface components can be classified into three categories: 1) Container Category; 2) Form Category; and 3) Button Category. The container category contains a twisty (e.g., twisty 200) and a tab (e.g., tab 300). The form category contains a data input form (e.g., data input form 400), a data display form (e.g., data display form 500), a data display table (e.g., data display table 600), and a double header data display table (e.g., double header data display table 1400). The button category contains top buttons (e.g., top buttons 700) and bottom buttons (e.g., bottom buttons 800).

Figure 9:
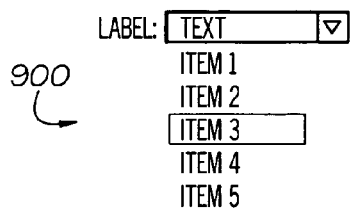
FIG. 9 depicts a one menu item selection interface that may be used as a user interface component of views of a portlet.
Figure 10:
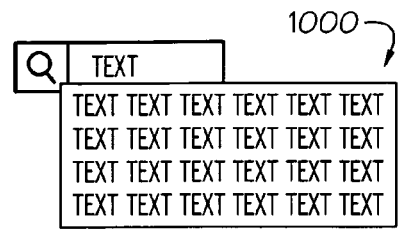
FIG. 10 illustrates a hover message that may be used as a user interface component of views of a portlet.
Figure 11:
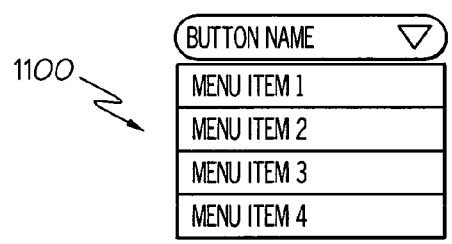
FIG. 11 depicts a hover menu that may be used as a user interface component of views of a portlet.
Figure 12:
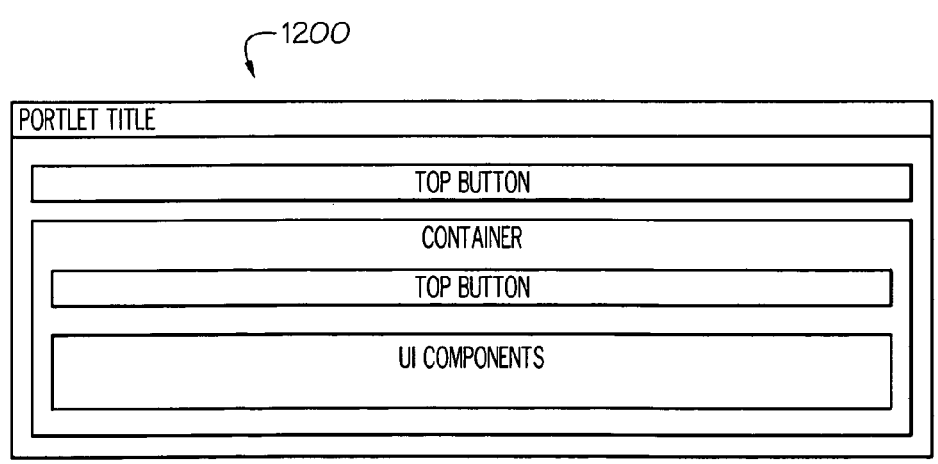
FIG. 12 illustrates a template for assembling user interface components into views of a portlet.
Figure 13:
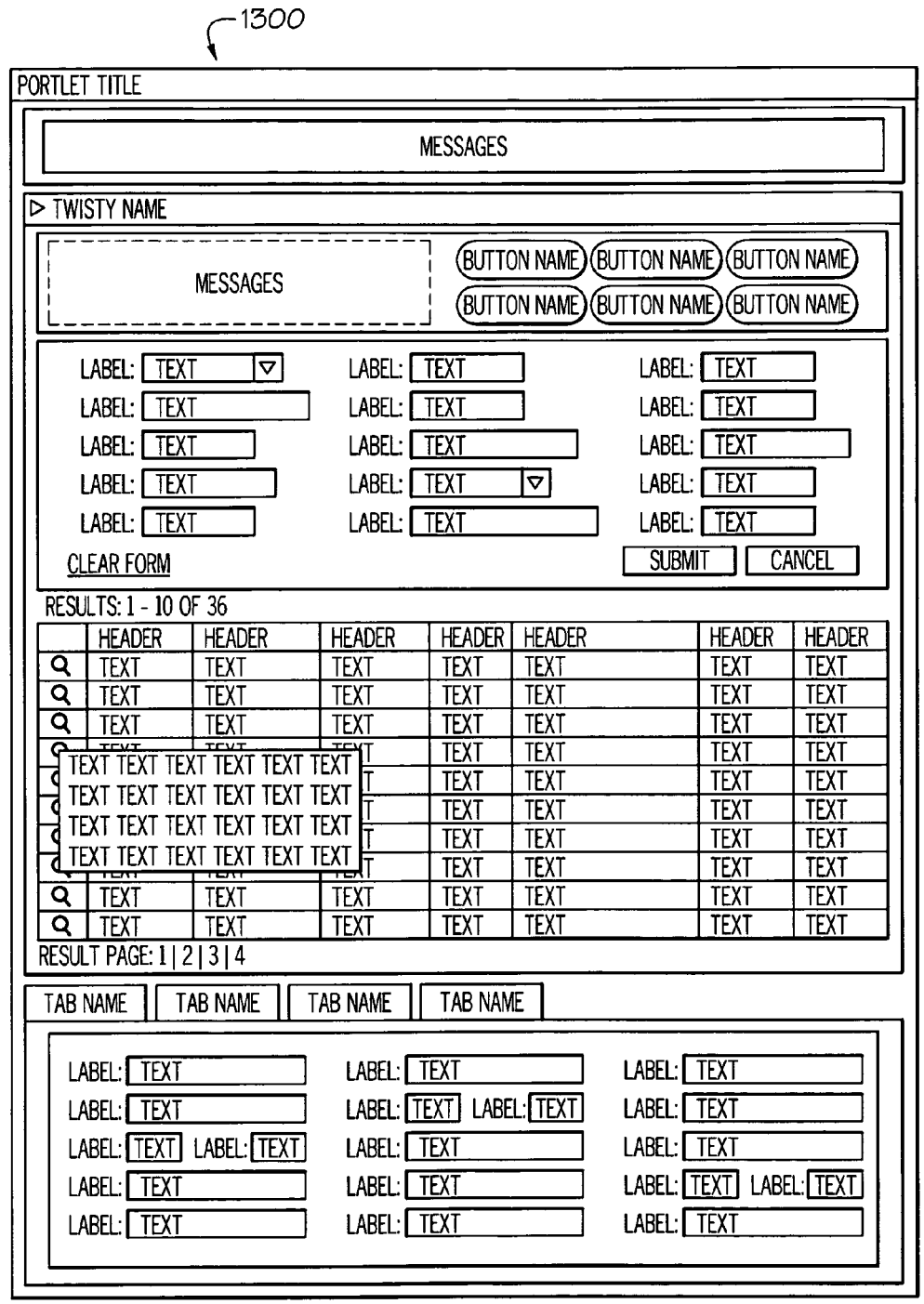
FIG. 13 depicts an exemplary portlet that has been created using the present invention.
Figure 15:
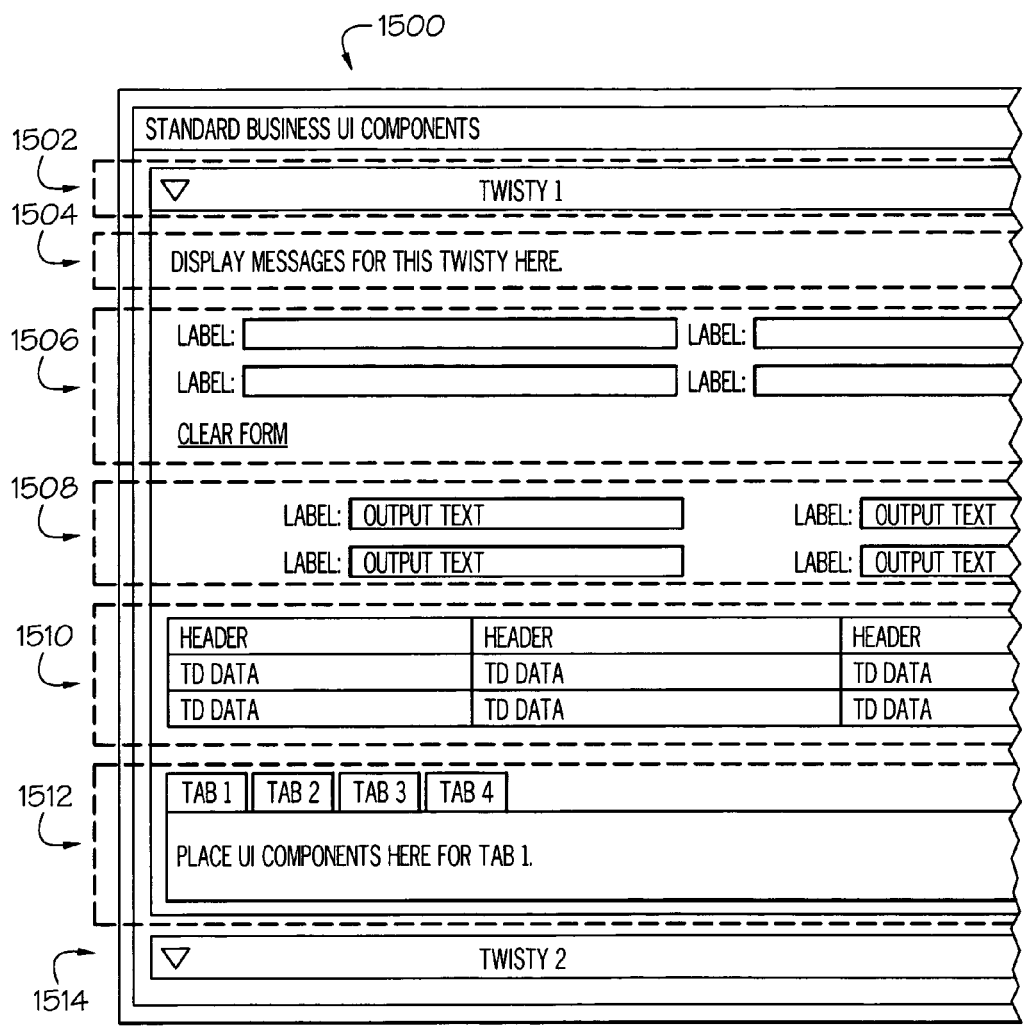
FIG. 15 depicts generally implemented elements and components in a portlet view that has been created using the present invention.

A user/developer may also identify some commonly used user interface elements of the standard business user interface components. For example, a one menu item selection, as shown in FIG. 9, is a commonly used user interface element 900 found in the standard business user interface component Data Input Form 400 shown above. A hover message 1000, as shown in FIG. 10, is a commonly used user interface element in the standard business user interface component Data Display Table 600 shown above. A hover menu 1100, as shown in FIG. 11, is a commonly used user interface element in the standard business user interface component Top Buttons 700 shown above.

In accordance with the present invention, a standardized template is created by PPDP 148 (using criteria that may be input by a portal/portlet developer) to define how these standard business user interface components can be assembled into a view of a portlet. According to this template, the above standard business user interface elements are put together into the standard business user interface components, and then the above standard business user interface components are put together into a view of a portal to create a very complicated portal such as portal 1300 shown in FIG. 13.

Customization

Although the views of the portlets can be constructed using these standard business user interface components, these standard business user interface components do not look exactly like specific views of portlets of a portal application. Therefore, these standard business user interface components of the views of portlets are customized in accordance with user-defined rules that regulate how to customize these standard business user interface components. Examples of these rules are:

Rule 1: Twisty—A twisty can be customized into one twisty or more.

Rule 2: Tab—A tab can be customized into one tab or more.

Rule 3: Data Entry Form—A data entry form can be customized into one row or more, a row can have one column or more.

Rule 4: Data Display Form—A data display form can be customized into one row or more, a row can have one column or more.

Rule 5: Data Display Table—A data display table can be customized into one row or more, a row can have one column or more.

Rule 6: Data Display Table—A data display table can be customized with double headers as shown in double header data display table 1400 in FIG. 14.

Rule 7: Button—Top buttons can be customized into one row or more, a row may have one button or more. If there are too many rows or too many buttons in a row, it is expected to use a hover menu.

Library of Standard Business User Interface Components

A user then implements the above standard business user interface elements and components generally to create a library of these standard business user interface elements and components. When implemented, these styles are also applied. The following is an example of those implemented standard business user interface components of that library. They are a top twisty 1502, top buttons 1504, data input form 1506, data display form 1508, data display table 1510, tabs 1512, and bottom twisty 1514, as shown in the final portal 1500 shown in FIG. 15.

Figure 16:
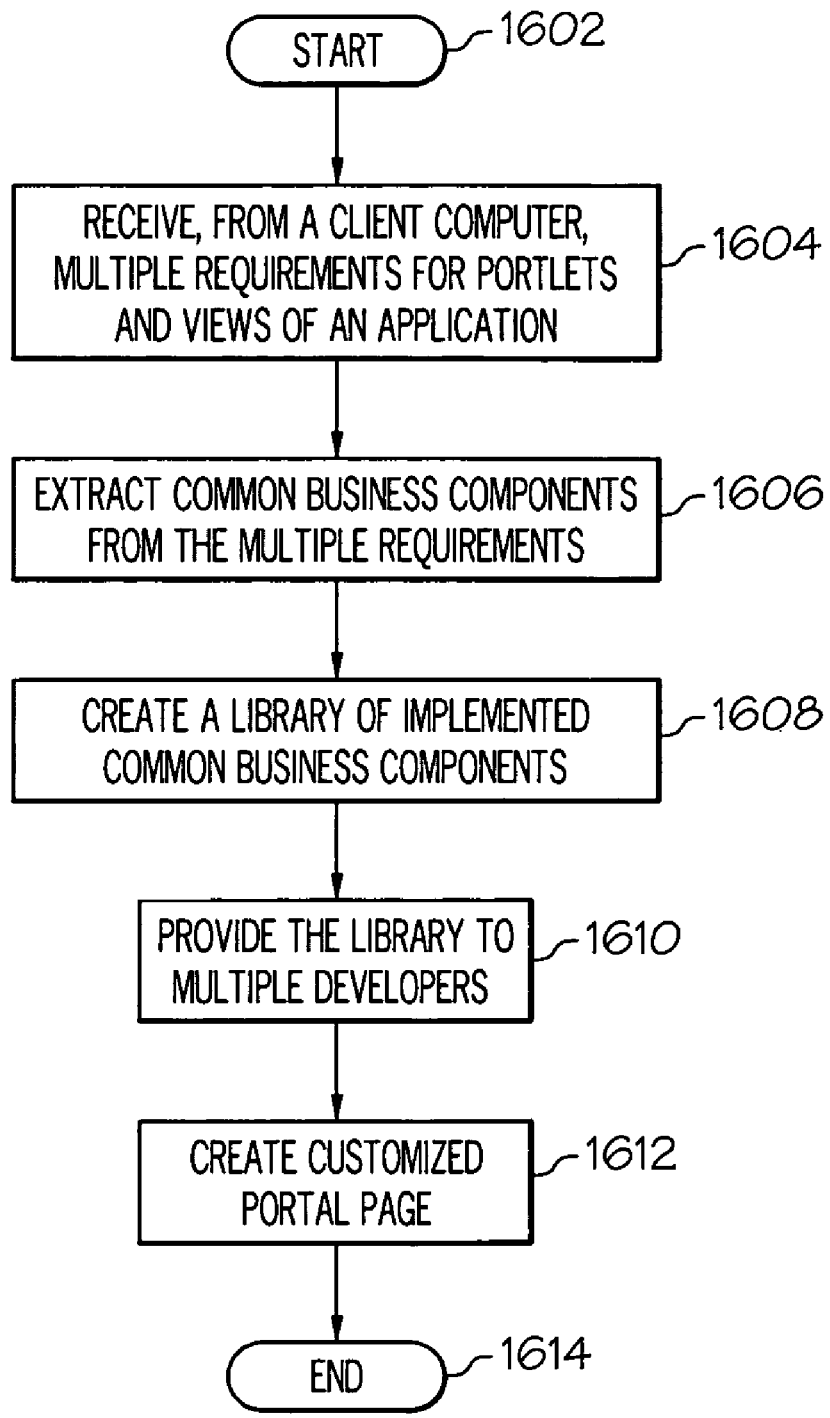
FIG. 16 is a high-level flowchart of exemplary steps taken to design and develop standardized views of portlets.

With reference now to FIG. 16, a high-level flowchart of exemplary steps taken to create a portal is presented. After initiator block 1602, multiple requirements for portlets and views of an application that uses such portlets in a portal are received from a client computer (block 1604). As described above in detail, common business components needed for such portlets/applications/portals are extracted according to the multiple requirements (block 1606). The implementation of the above standard business user interface elements and components makes up a library of them for a portal application, which library is then created (block 1608) and provided to multiple developers (block 1610). While developing views of portlets, portal developers get the codes from the library of standard business user interface components, paste them into Java Server Page (JSP) files of portlets, and then follow the above-described customization rules to copy a part of the codes and paste them to make necessary changes to the portlets. In this way the views of portlets that make up the customized portal page can be quickly created and completed (block 1612). Thus, the portlets maintain a consistent look and feel among them in a portal application. The process ends at terminator block 1614.

Note that the library of standard business user interface components can be reused for other similar portal applications. Alternatively, modifications to the implementation of this library can be made to meet the design of portlets of other portal applications.

The present invention provides several advantages over the prior art. First, the inventive approach described herein can save portal developers much time from developing the views of portlets by just applying user interface elements, such as an input field, a button and so on from portal development tools. Therefore, portlet development work is greatly accelerated. Secondly, the process disclosed herein frees developers from the time-consuming work of developing views to meet the designed look and feel of portlets such as the fonts, colors, spaces and so on. Third, the process disclosed herein makes it is easy to create a consistent look and feel among portlets. Fourth, the process disclosed herein allows the standard codes to be easily understood and maintained across all the portlets by others. Fifth, the standard business user interface components can be implemented once and reused to develop the views of portlets of some other similar portal applications.

Thus, this disclosed standard business user interface component based approach to design and develop the views of portlets allows portal designers to design the views of portlets using standard business user interface components, and allows the portal developers to develop the views of portlets by assembling those standard business user interface components. This process allows the developers to make necessary customizations to those standard business user interface components in order to complete the development of the views of portlets. This standard business user interface component based approach helps developers create views of portlets easily, thus saving them from the tedious work of creating a consistent look and feel among portlets. Furthermore, the codes of these standard business user interface components are easily understood and maintained by others. The approach disclosed herein greatly accelerates the portal development work, and allows standard business user interface components to be easily adapted to other similar portal projects.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:

1. A computer-implemented method of designing views of portlets for a portal application, the computer-implemented method comprising the steps of:
configuring a specific processor with computer-executable instructions, that when executed, perform the steps of:
receiving, from a client, multiple rules for portlets and views of a portal application; generating common business user interface components that comply with the multiple rules, wherein the multiple rules define how the common business user interface components are permitted to be customized into multiple business user interface components;
classifying the common business user interface components into user interface component categories, wherein the user interface component categories comprise a container category for twisties and tabs;
creating a library of implemented and classified common business user interface components, wherein the library stores the implemented common business user interface components according to the user interface component categories; and
providing the library to multiple developers to design the views of the portlets, wherein the views will have a similar look and feel within the portal application.

2. The computer-implemented method of claim 1, wherein the user interface component categories comprise a form category for data input forms, data display forms, and data display tables.

3. The computer-implemented method of claim 1, wherein the user interface component categories comprise a button category for top buttons and bottom buttons.

4. The computer-implemented method of claim 1, wherein the library contains executable code that generates, when executed, the common business user interface components.

5. The computer-implemented method of claim 1, wherein calling a software program that executes steps in the computer-implemented method results in a reconfiguration of a VHSIC Hardware Description Language (VHDL) chip, wherein a resulting reconfigured VHDL chip is a hardware chip that performs steps of the computer-implemented method without executing any software.

6. A non-transitory computer-readable storage medium on which is encoded a computer program, the computer program comprising computer executable instructions configured for designing views of portlets by:

receiving, from a client, multiple rules for portlets and views of a portal application;

generating common business user interface components that comply with the multiple rules, wherein the multiple rules define how the common business user interface components are permitted to be customized into multiple business user interface components;

classifying the common business user interface components into user interface component categories, wherein the user interface component categories comprise a container category for twisties and tabs;

creating a library of implemented and classified common business user interface components, wherein the library stores the implemented common business user interface components by the user interface component categories; and providing the library to multiple developers to design the views of the portlets, wherein the views will have a similar look and feel within the portal application.

7. The non-transitory computer-readable storage medium of claim 6, wherein the user interface component categories comprise a form category for data input forms, data display forms, and data display tables.

8. The non-transitory computer-readable storage medium of claim 6, wherein the user interface component categories comprise a button category for top buttons and bottom buttons.

9. The non-transitory computer-readable storage medium of claim 6, wherein the library contains executable code that generates, when executed, the common business user interface components.

10. A system comprising:

a processor;

a tangible computer-readable storage medium on which are stored computer-executable instructions, wherein the computer-executable instructions, when executed, perform a computer-executable method comprising:

receiving, from a client, multiple rules for portlets and views of a portal application;

generating common business user interface components that comply with the multiple rules, wherein the multiple rules define how the common business user interface components are permitted to be customized into multiple business user interface components;

classifying the common business user interface components into user interface component categories, wherein the user interface component categories comprise a container category for twisties and tabs;

creating a library of implemented and classified common business user interface components, wherein the library stores the implemented common business user interface components by the user interface component categories; and providing the library to multiple developers to design the views of the portlets, wherein the views will have a similar look and feel within the portal application.

11. The system of claim 10, wherein the user interface component categories comprise a form category for data input forms, data display forms, and data display tables.

12. The system of claim 10, wherein the user interface component categories comprise a button category for top buttons and bottom buttons.

13. The system of claim 10, wherein the library contains executable code that generates, when executed, the common business user interface components.

14. The system of claim 10, wherein calling a software program that executes steps in the computer-implemented method results in a reconfiguration of a VHSIC Hardware Description Language (VHDL) chip, wherein a resulting reconfigured VHDL chip is a hardware chip that performs steps of the computer-implemented method without executing any software.

\* \* \* \* \*